United States Patent [19]

Uchida

[11] Patent Number: 4,498,130

[45] Date of Patent: Feb. 5, 1985

[54] APPARATUS FOR REMOTELY OPERATING OUTPUT TERMINALS OF A COPYING MACHINE OR THE LIKE DURING SELF-DIAGNOSIS

[75] Inventor: Hiroyasu Uchida, Kanagawa, Japan

[73] Assignee: Fuji Xerox Co., Ltd., Tokyo, Japan

[21] Appl. No.: 406,148

[22] Filed: Aug. 9, 1982

[30] Foreign Application Priority Data

Aug. 10, 1981 [JP] Japan .............................. 56-124115

[51] Int. Cl.³ ........................................ G06F 15/46

[52] U.S. Cl. .................................. 364/188; 364/513; 371/17

[58] Field of Search .................... 371/17, 20; 364/146, 364/188, 189, 513

[56] References Cited

U.S. PATENT DOCUMENTS

| | | | |
|---|---|---|---|
| 4,021,651 | 5/1977 | Mitsuhashi et al. | 364/513 X |
| 4,380,796 | 4/1983 | Ostby | 364/188 X |
| 4,385,358 | 5/1983 | Ito et al. | 364/513 |
| 4,418,381 | 11/1983 | Molusis et al. | 364/188 X |

*Primary Examiner*—Jerry Smith
*Assistant Examiner*—Mark E. Ungerman
*Attorney, Agent, or Firm*—Sughrue, Mion, Zinn, Macpeak and Seas

[57] ABSTRACT

In a machine capable of self-diagnosis operation start and stop instruction signals can be applied from either the front control panel or from remote operating switches or switch receptacles, with one or the other instruction signals being selected to control a respective output terminal or machine component.

14 Claims, 4 Drawing Figures

APPARATUS FOR REMOTELY OPERATING OUTPUT TERMINALS OF A COPYING MACHINE OR THE LIKE DURING SELF-DIAGNOSIS

BACKGROUND OF THE INVENTION

This invention relates to an apparatus for remotely operating the output terminals of copying machines or the like during self-diagnosis, and more particularly to an apparatus for remotely operating the output terminals of a copying machine or the like during self-diagnosis in which a specified output terminal (or component) can be started and stopped not only by means of a front panel but also by means of remote operating means provided near the output terminals.

In maintenance and inspection or repair of a copying machine, it is common to individually operate components (or output terminals such as motors, relays and lamps) irrespective of the their normal interdependent operation so that they are subjected to self-diagnosis according to an inspection program which is stored in advance. A conventional self-diagnosis method, which is applied to a copying machine, will be briefly described with reference to FIG. 1.

FIG. 1 is a block diagram of a cpying machine which is controlled by a computer. In FIG. 1, reference numeral 1 designates a CPU (central processing unit); 2, a ROM (read-only memory); 3, a RAM (random access memory); 4, an input port; and 5, an output port.

Further in FIG. 1, reference numeral 6 designates a common bus connecting the CPU 1, the ROM 2, the RAM 3, the input port 4 and the output port 5 to one another; 10, a copying machine body which is connected through the input port 4 and the output port 5 to a computer section (consisting of the CPU 1, the ROM 2, the RAM 3, etc.); and 10A, the front panel of the copying machine body 10.

In self-diagnosing, the operating mode of the copying machine is changed from a copying mode to a self-diagnosis mode by operating switches (not shown) provided on the front panel or in another suitable location. The keys and switches on the front panel 10A display a self-diagnosis mode, specify parts to be inspected (i.e. output terminals such as motors, relays, lamps, etc.), start or stop the specified parts and display the states of these parts.

In general, a ten-key array is used to specify parts to be inspected, a copy start key and copy stop key are used to respectively start and stop those parts, and various display lamps and number-of-sheet display units are employed to display the states of the tested parts. In association with this, a self-diagnosis program which has been stored in the ROM 2 is called out and executed by operating the keys on the front panel. In performing the self-diagnosis of a copying machine or the like as described above, in the case of a relatively small copying machine or the like, how the specified parts actually operate can be confirmed while operating the keys and the switches on the front panel 10A. However, in the case of a relatively large copying machine or the like, there may be a considerable distance between the front panel 10A and the machine body 10 and a shielding material may be provided therebetween. Accordingly, it is sometimes difficult to confirm how the specified parts actually operate while operating the keys and the switches on the front panel 10A.

Especially when a specified part is operated for only a very short period of time, it may be impossible for one person to confirm the operation.

SUMMARY OF THE INVENTION

An object of this invention is to provide an apparatus for remotely operating output terminals during self-diagnosis by which the operation of any component at any position on a large device or machine can be visually confirmed during self-diagnosis.

In order to achieve the foregoing object, according to the invention, one or a plurality of remote operating means such as remote switches or receptacles for remote switches are provided at suitable positions on the machine, so that, when the machine is in the self-diagnosis mode, starting and stopping of a component which has been specified by the keys or switches on the front panel can also be effected by an instruction which is provided by the remote control means. Thus, the operator can stand close to the specified component while instructing the activation of the specified component for testing, and thereby visually confirm its correct operation.

BRIEF DESCRIPTION OF THE DRAWINGS

The invention will be more clearly understood from the following description in conjunction with the accompanying drawings, in which.

DETAILED DESCRIPTION OF THE INVENTION

One embodiment of this invention will now be described in detail with reference to FIGS. 2 and 3.

Figure 1:
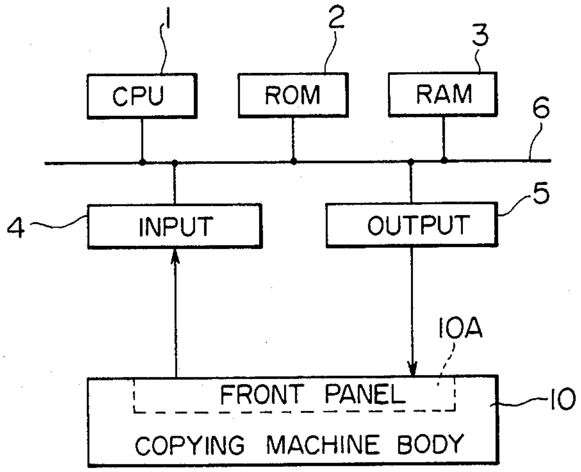
FIG. 1 is a block diagram outlining the arrangement of a copying machine having a conventional self-diagnosis system.
Figure 2:
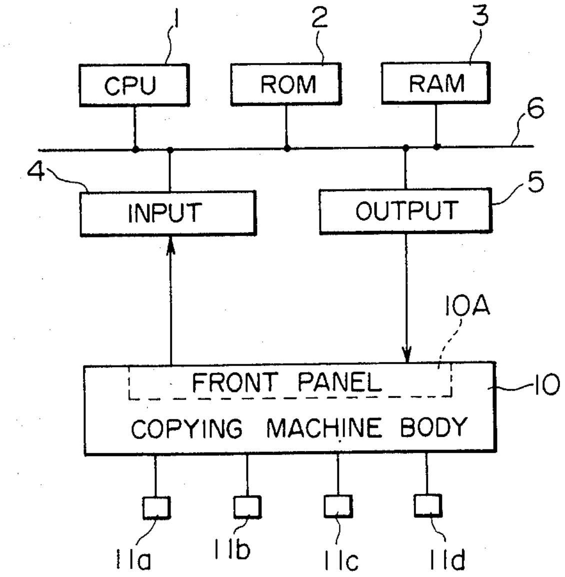
FIG. 2 is a block diagram outlining the arrangement of one embodiment of this invention.

FIG. 2 is a block diagram showing the embodiment of the invention and those components which have already been described with reference to FIG. 1 are therefore similarly numbered. In FIG. 2, reference characters 11*a* through 11*d* designate remote operating means (e.g., remote switches or receptacles for remote switches) which are additionally provided according to this invention.

Remote on/off means (such as switches) for turning on and off the remote operating means 11*a* through 11*d* are provided on the front panel 10A of the machine body 10, or at other suitable positions. Alternatively, control data are stored in the RAM 3 by operating the keys on the front panel 10A, so that the remote operating means are turned on and off according to the program.

For convenience in description, it should be noted that, in this embodiment, the remote operating means are turned on and off by operating the keys on the front panel 10A and that signals from the remote operating means are then applied through the input port 4 to the RAM 3.

Figure 3:
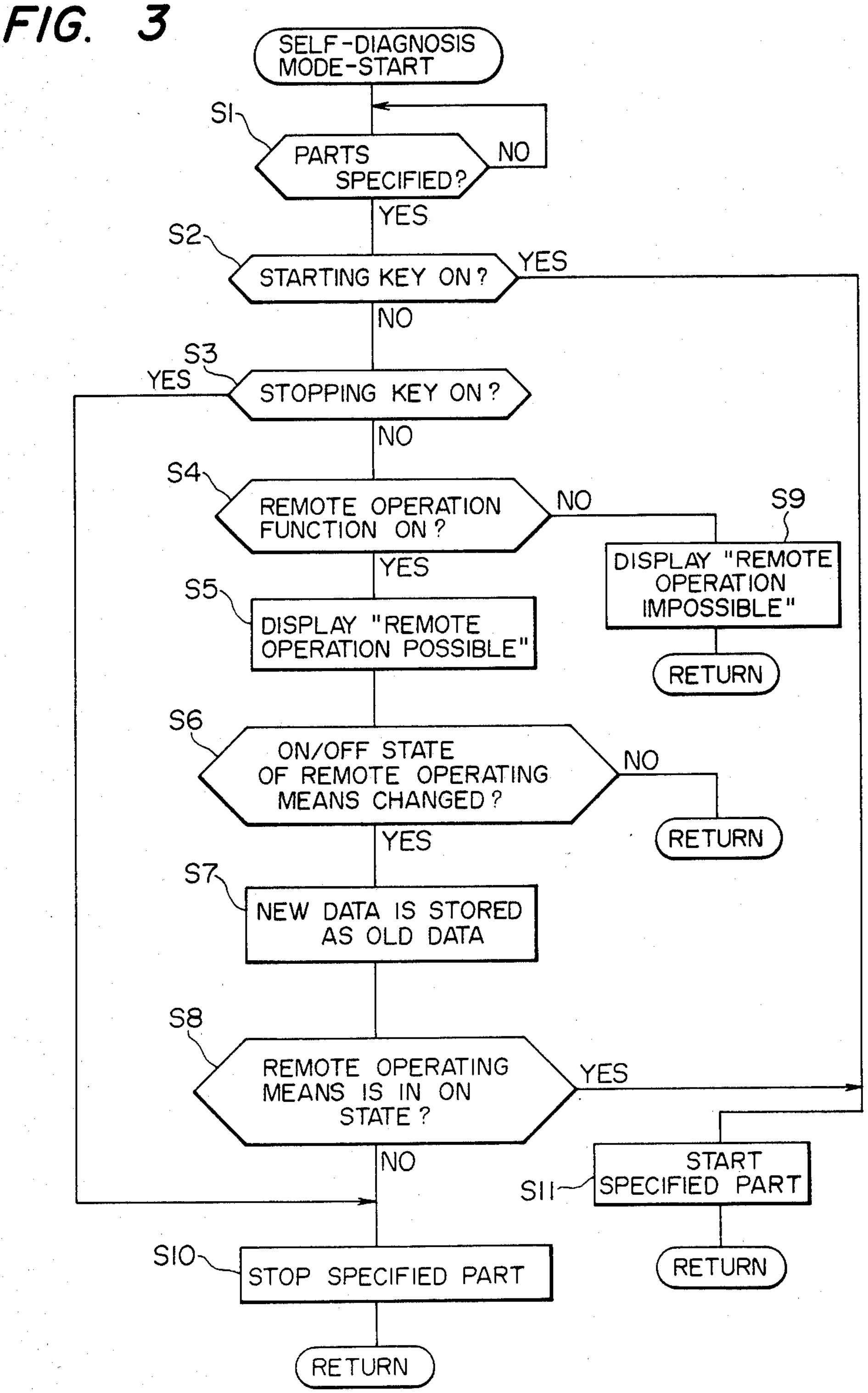
FIG. 3 is a flow chart for a description of the operation of this invention.

FIG. 3 is a flow chart for a description of the operation of the invention.

When the machine in placed in the self-diagnosis mode, it is determined in Step S1 whether parts to be diagnosed (such as motors, relays and lamps) have been specified by operating the keys on the front panel 10A. If no parts are yet specified, Step S1 is repeated until they are specified.

After a part has been specified for self-diagnosis, the operation is advanced to Step S2, so as to confirm whether or not the key for starting the specified part has been turned on. After it is confirmed that the key has been turned on, the operation is advanced to Step S11. The part is then started and the operation returns to its initial state.

If the start key on the front panel 10A has not yet been turned on, the operation step is advanced to Step S3, so as to determine whether or not the stop key on the front panel 10A for stopping the specified part has been turned on. If the key has been turned on, the operation step is advanced to S10. The specified part is then stopped and the operation returns to its initial state.

The above-described operation is the same as a conventional self-diagnosis operation. According to the present invention, however, if it is determined in Step S3 that the key on the front panel has not been turned on, i.e., if a part to be self-diagnosed has been specified but no instruction for starting or stopping the part has been applied by the front panel 10A, the operation step is advanced to Step S4 so as to determine whether or not the remote operation function for that part is turned on.

If the remote operation function is not on, then the operation step is advanced to Step S9. The display "REMOTE OPERATION IMPOSSIBLE" is made and the operation step is then returned to its initial state. If it is determined in Step S4 that the remote operation function has been turned on, the operation step is advanced to Step S5. The display "REMOTE OPERATION POSSIBLE" is made and the operation is then advanced to Step S6.

In Step S6, it is determined whether or not the on/off state of the remote operating means has been changed. This determination is carried out by comparing in the CPU 1 the old data of the remote operating means (the data indicating the preceding on/off state) which is stored in the RAM 3 with the new data representative of the present on/off state of the remote operating means which is newly loaded in the RAM 3 through the input port 4.

When it is determined that the old data is equal to the new data, i.e., that the state of the remote operating means has not been changed, the operation is returned to its initial state. When it is determined that the old data is not equal to the new data, i.e., that the state of the remote operating means has been changed, the operation is advanced to Step S7.

In Step S7, the aforementioned new data representative of the present on/off state of the remote operating means is stored, as old data, in the RAM 3. The operation is then advanced to Step S8 where it is determined whether the new data (now the "old" data but still representative of the present on/off state of the remote operating means) indicates an "on" state or an "off" state.

When it is determined that the remote operating means is in the "on" state, operation is advanced from Step S8 to Step S11 so that the specified part (or the output terminal) in Step S1 is started. When it is determined that the remote operating means is in the "off" state, the operation is advanced to Step S10 so that the specified part (or the output terminal) is stopped.

As is apparent from the above description, according to the procedure shown in FIG. 3, control by the operation of keys on the front panel 10A takes precedence over control by means of the remote operating means 11a–11d. For instance, even if a remote operating means is switched so as to start an output terminal (such as a motor), the output terminal is stopped when the front panel 10A provides an instruction to stop the output terminal. However, the operating procedure of the invention is not limited to that shown in FIG. 3. That is, it may be possible to replace some steps or to add other functions of steps. For example, if it is desired that a control input from the front panel be ineffective when the remote operating function is in the "on" state, the program should be so changed that in Step S5 the display "REMOTE OPERATION POSSIBLE" is made and an input instruction from the front panel is ineffective. This can be easily accomplished by performing the decision Step S4 between Step S1 and Step S5, with the "YES" decision leading to Step S5 and the "NO" decision leading to Step S9. A display of "REMOTE OPERATION IMPOSSIBLE" would be made and the output of Step S9 would then lead to Step S2 rather than to the initial state, so that an input instruction from the front panel would be effective.

Figure 4:
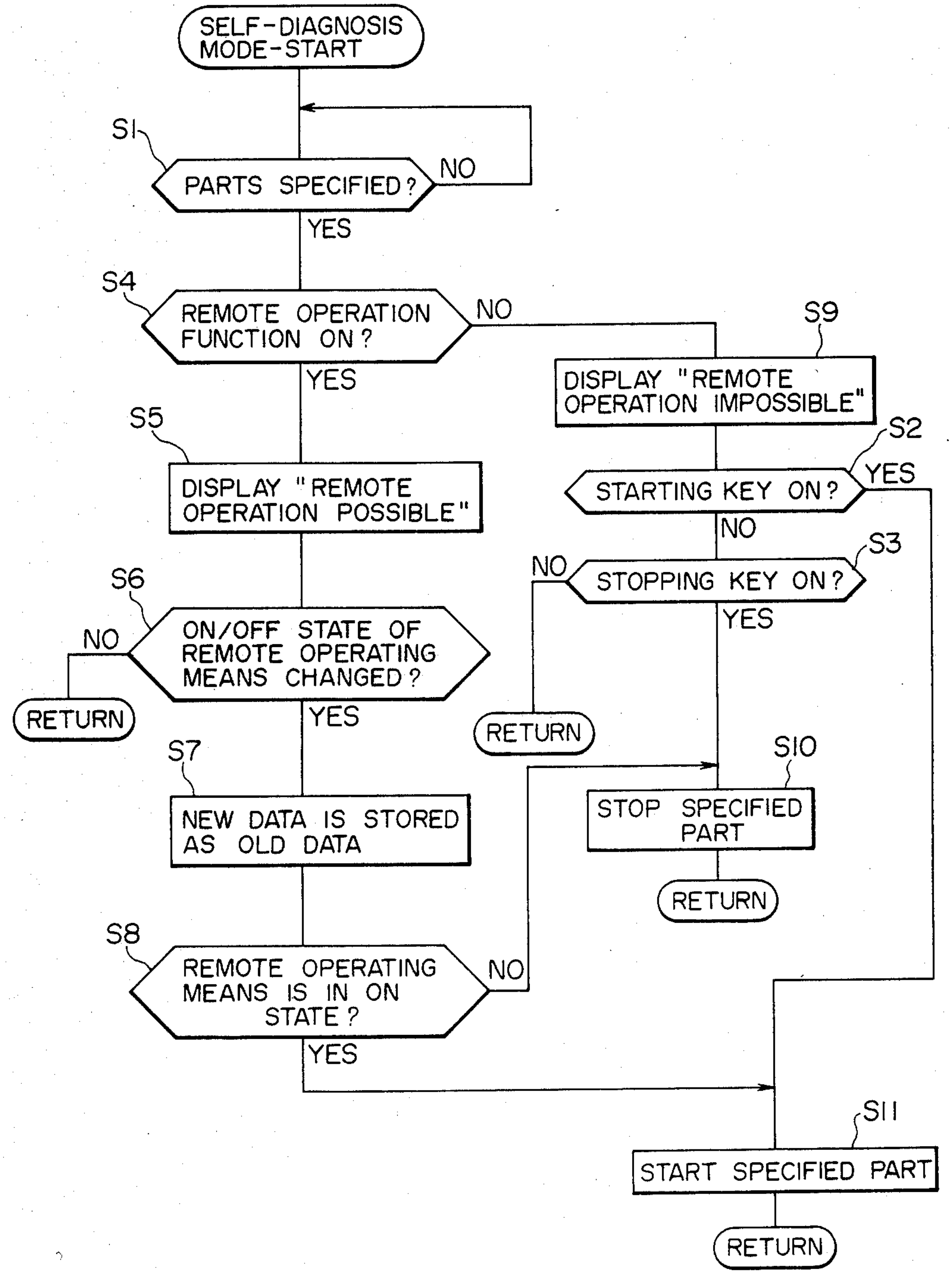
FIG. 4 is a further flow chart showing another example of the operation of the invention.

FIG. 4 shows another example of the operating procedure of the invention which has been modified as described above to give priority to the remote operation function. In FIGS. 4 and 3, blocks having the same step numbers have the same contents. The operating procedure in FIG. 4 is different from that in FIG. 3 in that the remote operating function on/off decision is effected before the front panel key operation decision.

In the above-described embodiments, the on/off state of the remote operating means is inputted through the input port 4 into the computer. However, the invention may be so modified that a pulse signal is produced at the time of switching the remote operating means on and off, and in which the logical product of the signal thus produced and the signal which is provided in operating the start and stop keys on the front panel is stored in the RAM 3.

As is apparent from the above description, according to the invention, in self-diagnosing a copying machine or the like, starting and stopping of the parts and the output terminals to be inspected can be controlled not only by operating the keys on the front panel but also by operating the remote operating means provided near the parts and output terminals. Therefore, the invention is advantageous in that the operating conditions of the parts and output terminals can be visually confirmed, and accordingly not only can problems be readily found but also maintenance and inspection can be readily achieved.

I claim:

1. An apparatus for operating output means of a copying machine during a diagnosis operating mode, said machine being capable of operating in a normal operating mode and a diagnosis mode, said machine having a controlling front panel, a plurality of said output means coupled to said front panel, said apparatus being of the type having operating means for operating said output means during said diagnosis mode in response to stop and start instruction signals and first control means at said front panel for providing said start and stop instruction signals, the improvement comprising:

second control means providing start and stop instructions signals, said second control means comprising a plurality of control elements each corresponding to a different output means, and each control element being located remote from said front panel and in the vicinity of the output means to which it corresponds; and said operating means operating said output means in response to stop and start instruction signals from at least one of said first and second control means.

2. An apparatus as claimed in claim 1, wherein said operating means comprises switch means for designating one of said first and second control means, and selecting means responsive to said switch means for selecting the start and stop instruction signals from either said first control means or said second control means, said output means being operated in response to the selected start and stop instruction signals.

3. An apparatus as claimed in claim 1, wherein said operating means comprises switch means for designating one of said first and second control means, said operating means responding to said switch means for operating said output means in accordance only with said start and stop instruction signals from said designated control means.

4. An apparatus as claimed in claim 3, wherein said designated control means comprises said first control means.

5. An apparatus as claimed in claim 1, wherein said operating means comprises switch means for designating one of said first and second control means, said operating means responding to said switch means for operating said output means in accordance with start and stop instruction signals from both of said first and second control means while giving priority to the designated one of said control means.

6. An apparatus as claimed in claim 5, wherein said designated one of said first and second control means comprises said second control means.

7. An apparatus as claimed in claim 1, wherein said plurality of control elements are each located at a fixed location remote from said controlling panel and in the vicinity of the output means to which each respective control element corresponds.

8. An apparatus as claimed in claim 7, wherein said selecting means gives priority to said start and stop instruction signals from said first control means.

9. An apparatus as claimed in claim 7, wherein said selecting means gives priority to said start and stop instructions from said second control means.

10. An apparatus as claimed in claim 1, further comprising specifying means at said front panel for specifying which of said output means are to be controlled in accordance with said start and stop instructions.

11. An apparatus as claimed in claim 1, wherein said selecting means comprises a controlling computer section.

12. An apparatus as claimed in claim 11, wherein said controlling computer section comprises memory means for storing a diagnosis program, and a processing unit for executing said program for diagnosis, said processing unit selecting said start and stop instruction signals in accordance with said program.

13. An apparatus for operating output means of a machine during a diagnosis operating mode, said machine being capable of operating in a normal operating mode and a diagnosis mode, said machine having a controlling front panel and a plurality of output means coupled to said front panel, said apparatus being of the type having operating means for operating said output means during said diagnosis mode in response to stop and start instruction signals and first control means at said front panel for providing said start and stop instructions signals, the improvement comprising:

second control means providing start and stop instruction signals, said second control means comprising a plurality of control elements each corresponding to a different output means and each being located at a fixed location remote from said front panel and in the vicinity of output means to which each control element corresponds;

designating means for designating one of said first and second control means; and selecting means responsive to said designating means for selecting the start and stop instruction signals from either said first control means or said second control means, said output means being operated in response to the selected start and stop instruction signals.

14. An apparatus as claimed in claim 13, wherein said machine is a copying machine.

* * * * *